United States Patent [19]
Takasu

[11] 3,903,750
[45] *Sept. 9, 1975

[54] SPEED REDUCTION MECHANISM

[75] Inventor: Isamu Takasu, Tokyo, Japan

[73] Assignee: Toyo Glass Machinery Co., Ltd., Japan

[ * ] Notice: The portion of the term of this patent subsequent to May 6, 1992, has been disclaimed.

[22] Filed: Jan. 30, 1974

[21] Appl. No.: 437,786

[52] U.S. Cl. .................................. 74/63; 74/116
[51] Int. Cl. ........................................ F16h 21/12
[58] Field of Search .................. 74/63, 116, 122

[56] References Cited
UNITED STATES PATENTS
2,704,459   3/1955   Nanni ................................. 74/63

*Primary Examiner*—Wesley S. Ratliff, Jr.
*Attorney, Agent, or Firm*—Robert E. Burns; Emmanuel J. Lobato; Bruce L. Adams

[57] ABSTRACT

A speed reducer effecting speed reduction without gears and having an eccentric with a disc mounted freely for rotation on the eccentric. The disc has a plurality of elongated driving lugs or studs arranged in a circle and extending generally in a common direction parallel to the axis of rotation of the speed reducer. A driven output member constructed as an output pulley is rotatable about the axis of rotation and it has a plurality of elongated driven lugs or studs arranged in a second circle circumferentially of the first circle. The driven lugs or studs are greater in number than the driving lugs. As the input rotation is applied to the speed reducer the disc has imparted thereto an eccentric circular motion but it is constrained from rotating about the eccentric or axis of rotation. As it makes its circular motion the individual driving lugs thereof periodically and successively make tangential contact with adjacent driven lugs and impart rotation thereto in a corresponding direction of rotation so that the driven member rotates at a lesser speed of rotation than the input speed of rotation.

5 Claims, 4 Drawing Figures (A)

(B)

SPEED REDUCTION MECHANISM

This is a continuation of my application Ser. No. 416,102 filed Nov. 15, 1973, now abandoned.

BACKGROUND OF THE INVENTION

The present invention relates to speed reduction mechanism and more particularly to a new and improved speed reducer that uses no gears in its power transmission system.

Speed reducers of various types are known. Generally the known speed reduction mechanisms have gear systems therein that are difficult to construct, they require making of the gears, and accordingly are relatively expensive and complex.

SUMMARY OF THE INVENTION

It is a primary object of the invention to provide a speed reduction mechanism of a type in which no gears are used in transmission of power from the input to the output.

Another object is to provide a speed reduction mechanism which is compact and inexpensive to manufacture in view of the absence of gears therein.

Another object is to provide a speed reducer capable of functioning with a low power input and with a low noise level.

Still another object of the present invention is to provide a speed reduction mechanism which can smoothly transmit power from a driving or input shaft to an output or driven member and which operates with extremely low power loss and noise.

A speed reducer according to the invention comprises a driven output pulley having a surface mounting a plurality of driven lugs arranged in a first circle angularly spaced from each other and extending in a common direction parallel to the axis of rotation. Driving means have driving eccentric means eccentric to its center and whose center is displaced from the axis of rotation of the driven output pulley. A disc is mounted for circular movement on the eccentric means without rotation about the axis of rotation of the speed reducer. The disc has a second plurality of driving lugs disposed in a second circle of lesser diameter than the first circle, internally thereof, and extending in a common direction. The second plurality of lugs are less in number than the first plurality of lugs. This second plurality of lugs has the lugs disposed for successive ones of the lugs thereof engaging periodically, during eccentric movement of the disc, adjacent lugs of the first plurality of lugs for imparting thereto movement in a corresponding direction. The driven pulley is accordingly driven rotationally at a speed substantially less than the speed of rotation of an input applied to the driven pulley.

BRIEF DESCRIPTION OF THE DRAWINGS

Other features and advantages of the speed reduction mechanism according to the invention will be apparent from the disclosure and appended claims and drawings in which:

DESCRIPTION OF THE PREFERRED EMBODIMENT

Figure 1:
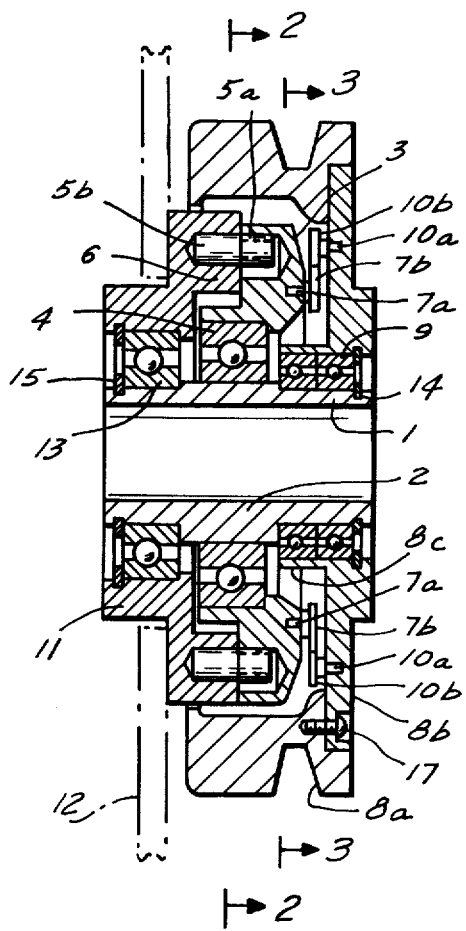
FIG. 1(A) is a longitudinal section view of a speed reduction mechanism according to the invention.
FIG. 1(B) is a front elevation view of the mechanism in FIG. 1(A)
Figure 1:
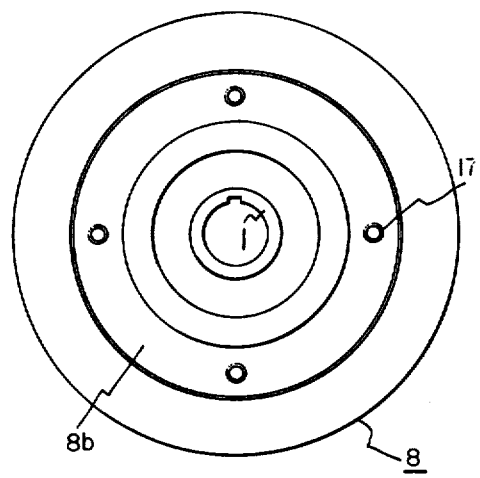

The speed reducer or speed reduction mechanism according to the invention illustrated in the drawings comprises a bushing or boss 1 for receiving a rotary input from an input shaft, not shown, extending therein to. The rotary boss has an eccentric 2 integral therewith which has eccentricity with respect to its center C. The center C is displaced a distance S from the center or axis of rotation $C_o$ of the input shaft or axis of rotation of the boss 1. An eccentrically driven disc 3 is mounted for free movement on the eccentric by a bearing 4. This disc is restrained from rotating by restraining lugs or pins 5, each having a roller portion 5a rotatable on a pin body portion 5b. The lugs 5 extend into guide holes or openings 6 in the disc which are of greater diameter than the restraining lugs so that the disc can carry out a "circular" movement as later explained, without rotation, in a closed path when a rotary input is applied by the input shaft.

The member disc member 3 has a plurality of driving lugs or studs 7 on a surface thereof, extending generally in a common direction and parallel to the axis of the driving shaft or axis of rotation of the apparatus. In the example illustrated the lugs or pins 7 each consist of a roller portion 7a rotatable on a roll pin portion 7b and are arranged in a circle circumferentially of the axis of rotation equally spaced from each other and lie equally spaced on a circle described around the center C of eccentric boss portion 2.

A driven output member or pulley unit 8 is freely mounted for rotation concentrically with the driving shaft boss 1 by means of a bearing 9. The driven pulley has a pulley unit 8a and a driven disc member 8c formed unitary with a flange portion 8b. A face of the driven disc flange 8b has secured thereon a plurality of driven lugs or studs 10 each having a roller portion 10a rotatable about a pin body portion 10b. The studs 10 and extend generally in a common direction parallel to the axis of rotation of the apparatus and are arranged in a circle circumferentially of the axis of rotation equally spaced thereon. The number of driven lugs 10 is larger than that of the driving lugs 7 and a suitable number is selected depending on the desired speed reduction ratio. In the embodiment illustrated the number of driven lugs 10 is fifteen as compared with that of fourteen of the driving lugs 7. As a result of this a speed reduction ration 15:1 is obtained as hereinafter explained.

As indicated heretofore the intermediate disc member 3 is restrained from rotation by restraining lugs or pins 5 extending into openings 6 thereon. These lugs are mounted on a stationary disc 11 securely fixed to a frame member 12 which is rigid on a base of the prime mover, not shown, that supplies the input and the support for the driving shaft boss 1 rotatably by means of a bearing 13 which also supports the entire mechanism.

A plurality of retainer rings 14, 15 retain respectively the bearings 4, 9 and 13 in position. The stationary disc member 11 is secured through screw holes 17 to the frame member 12 and the driven pulley 8a is secured to the driven disc member 8 by screws or bolts.

The driving input shaft, not shown, is driven directly or indirectly by means of a prime mover, not shown. Accordingly the driving shaft boss 1 is rotated at the speed of the input mover. The eccentric will rotate therewith and the intermediate disc member 3 is moved in motion which can be thought of as "circular" and is restricted from rotation because of the aforementioned arrangement of the restraining lugs 5 and associated guide holes 6. The disc 3 does not rotate but is permitted to move in a closed path within a range afforded by the clearance of the restraining lugs 5 in the guide holes 6.

The movement of the eccentric disc 3 causes the driving lugs 7 thereon to move such that each will successively be brought into operative engagement with the driven lugs 10 disposed circumferentially thereof and the driven lugs will be driven in a rotary motion. Accordingly the driven disc member 8c and hence the flange portion 8b and driven pulley 8a are rotatably driven. As indicated heretofore by suitably selecting the number of lugs in each circle the driven pulley 8 can be rotated at the desired speed with respect to that of the driving shaft boss 1. As indicated heretofore the relative or relative speeds or rotational speed ratio of the driving shaft boss 1 and the pulley 8 is 15:1.

Figure 2:
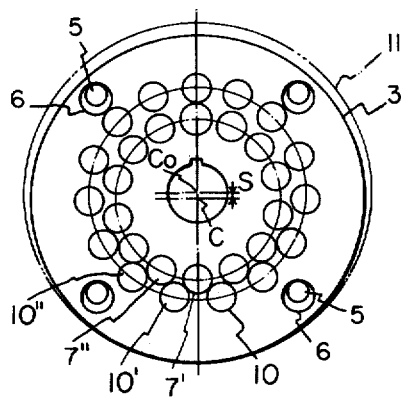
FIG. 2 is a diagrammatic view taken along section line 2—2 of FIG. 1(A)
Figure 3:
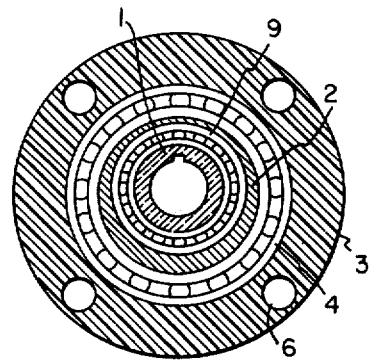
FIG. 3 is a section view taken along section line 3—3 of FIG. 1(A).

A better understanding of the manner in which the driving lugs that drive the driven lugs can be had from the diagrammatical illustration in FIG. 2. In the illustration in FIG. 2 the driving lugs 7 are being moved in a clockwise direction. They are at their lowermost position allowed by the "circular" motion of the intermediate disc 3. The driving lug 7' is tangentially in contact with two successive driven lugs 10. The contact is tangential to impart motion in a clockwise direction to a driven lug 10'. It can be seen that an adjacent driving lug 7'' is in contact with two successive driven lugs and imparts some rotary motion to a driven lug 10'' in a clockwise direction. In this manner the individual driving lugs are successively brought into operative engagement with two corresponding adjacent driven lugs 10 and drive the driven lugs in a clockwise direction. As a result of this the flange portion 8b is driven and hence the driven pulley 8a is made to rotate at reduced speed.

The tangential contact is possible since the driving and driven lugs are disposed on circles with different centers and on different radii since there are a different number of studs in each circle. Moreover, the radii of the studs on the two circles are offset as it were. The rotation of the eccentric and because of the sufficiency of the radii offset and the overall eccentricity from the axis of rotation of the apparatus the individual driving lugs will be "inserted" individually between two adjacent driven lugs into tangential contact with a driven lug to which the clockwise closed path movement, of the driving disc and driving lugs, is imparted. This takes place in sequential tangential contacts and the desired drive at a reduced speed takes place.

The ratio of speed reduction is the quotient obtained by dividing the difference between the number of the driven lugs and that of the driving lugs by the number of the driven lugs. Accordingly in the instant embodiment the ratio of speed reduction is 1/15.

Those skilled in the art will understand that the apparatus can be constructed from suitable materials. The various rollers can be made of a suitable bearing steel and the apparatus will still be relatively quiet or silent in operation.

What I claim and desire to secure by Letters Patent:

1. A speed changer comprising;
housing means defining a central axis;
an eccentric rotatable about said central axis at a first speed;
a disc mounted on said eccentric for rotation relative thereto but locked against rotation about said axis;
means for mounting the disc for circular movement in a closed path, on rotation of the eccentric;
a driven rotor mounted for rotation about said axis; and
means for converting circular movement of the disc into rotation of the driven rotor comprising means defining a first circle on said disc, a number of first lugs equally circumferentially spaced apart on said first circle, means defining a second circle on said driven rotor, one of said circles being disposed around the other, and a different number of second lugs equally circumferentially spaced apart on said second circle, the first and second lugs being positioned to bear approximately tangentially on one another individually and sequentially in response to circular motion of the disc and thereby to produce the rotation of the driven rotor at a speed different from said speed of the eccentric.

2. A speed changer according to claim 1 wherein the eccentric is a sleeve-like boss.

3. A speed changer according to claim 1 wherein the driven rotor comprises a pulley.

4. A speed changer according to claim 3 wherein said pulley has an outer circumferential portion surrounding said disc.

5. A speed changer according to claim 4 wherein the outer circumferential portion of said pulley also surrounds at least part of said housing.

* * * * *